US010389739B2

(12) United States Patent
Solotorevsky

(10) Patent No.: US 10,389,739 B2
(45) Date of Patent: Aug. 20, 2019

(54) SYSTEM, METHOD, AND COMPUTER PROGRAM FOR DETECTING REGULAR AND IRREGULAR EVENTS ASSOCIATED WITH VARIOUS ENTITIES

(71) Applicant: Amdocs Development Limited, Limassol (CY)

(72) Inventor: Gad N. Solotorevsky, Even Yehuda (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 199 days.

(21) Appl. No.: 15/482,368

(22) Filed: Apr. 7, 2017

(65) Prior Publication Data
US 2018/0295141 A1    Oct. 11, 2018

(51) Int. Cl.
| H04L 29/06 | (2006.01) |
| G06F 21/55 | (2013.01) |
| G06N 20/00 | (2019.01) |
| G06N 5/04 | (2006.01) |
| G07C 9/00 | (2006.01) |

(52) U.S. Cl.
CPC ........ *H04L 63/1416* (2013.01); *G06F 21/554* (2013.01); *G06N 5/04* (2013.01); *G06N 20/00* (2019.01); *G07C 9/00896* (2013.01); *H04L 63/1425* (2013.01); *G07C 2009/00928* (2013.01)

(58) Field of Classification Search
None
See application file for complete search history.

(56) References Cited

U.S. PATENT DOCUMENTS

| 7,743,001 B1 * | 6/2010 | Vermeulen | G06Q 30/02 705/400 |
| 7,930,122 B2 | 4/2011 | Yuan et al. | |
| 8,176,159 B2 | 5/2012 | Kashi | |
| 8,312,157 B2 | 11/2012 | Jakobsson et al. | |
| 9,280,661 B2 | 3/2016 | Adjaoute | |
| 9,400,879 B2 | 7/2016 | Tredoux et al. | |
| 2010/0228580 A1 | 9/2010 | Zoldi et al. | |

(Continued)

FOREIGN PATENT DOCUMENTS

| EP | 2955903 A1 | 12/2015 |
| WO | 2014043360 A1 | 3/2014 |

OTHER PUBLICATIONS

International Search Report and Written Opinion from PCT Application No. PCT/IB2018/052016, dated Jul. 12, 2018.

*Primary Examiner* — Fatoumata Traore
(74) *Attorney, Agent, or Firm* — Zilka-Kotab, P.C.

(57) ABSTRACT

A system, method, and computer program product are provided for detecting regular and irregular events associated with various entities. In operation, an event detection system detects at least one event associated with at least one entity. The event detection system identifies the at least one entity. Additionally, the event detection system identifies one or more historical patterns associated with the at least one event. Further, the event detection system determines whether the at least one event is anomalous based on the one or more historical patterns and details associated with the at least one event. Moreover, the event detection system performs at least one action based on whether the at least one event is determined to be anomalous.

16 Claims, 8 Drawing Sheets

(56) References Cited

U.S. PATENT DOCUMENTS

| | | |
|---|---|---|
| 2012/0204257 A1 | 8/2012 | O'Connell et al. |
| 2014/0201120 A1 | 7/2014 | Lydon et al. |
| 2014/0230051 A1 | 8/2014 | Vallinayagam et al. |
| 2015/0046332 A1 | 2/2015 | Adjaoute |
| 2015/0106927 A1 | 4/2015 | Ferragut et al. |
| 2015/0381646 A1 | 12/2015 | Lin |
| 2016/0092681 A1 | 3/2016 | Valles et al. |
| 2016/0196301 A1 | 7/2016 | Solotorevsky |
| 2016/0205123 A1* | 7/2016 | Almurayh ........... H04L 63/1425 726/23 |
| 2018/0091327 A1* | 3/2018 | McLaughlin ....... H04L 12/2823 |
| 2018/0124080 A1* | 5/2018 | Christodorescu ... H04L 63/1425 |

\* cited by examiner

SYSTEM, METHOD, AND COMPUTER PROGRAM FOR DETECTING REGULAR AND IRREGULAR EVENTS ASSOCIATED WITH VARIOUS ENTITIES

FIELD OF THE INVENTION

The present invention relates to event identification, and more particularly to detecting regular and irregular events associated with various entities.

BACKGROUND

Smart home, smart city, smart car, and smart appliances, etc., offer smooth interaction with human users. Part of the "smart" concept of these and many other smart entities is to anticipate and detect a user's needs and desires and create a supportive ecosystem to facilitate such needs and desires.

Currently, solutions are being generated to facilitate easier interaction with, and access to, these smart systems. This, however, creates a risk that unauthorized users and systems will take advantage of this easier access to the smart systems.

There is thus a need for addressing these and/or other issues associated with the prior art.

SUMMARY

A system, method, and computer program product are provided for detecting regular and irregular events associated with various entities. In operation, an event detection system detects at least one event associated with at least one entity. The event detection system identifies the at least one entity. Additionally, the event detection system identifies one or more historical patterns associated with the at least one event. Further, the event detection system determines whether the at least one event is anomalous based on the one or more historical patterns and details associated with the at least one event. Moreover, the event detection system performs at least one action based on whether the at least one event is determined to be anomalous.

DETAILED DESCRIPTION

Figure 1:
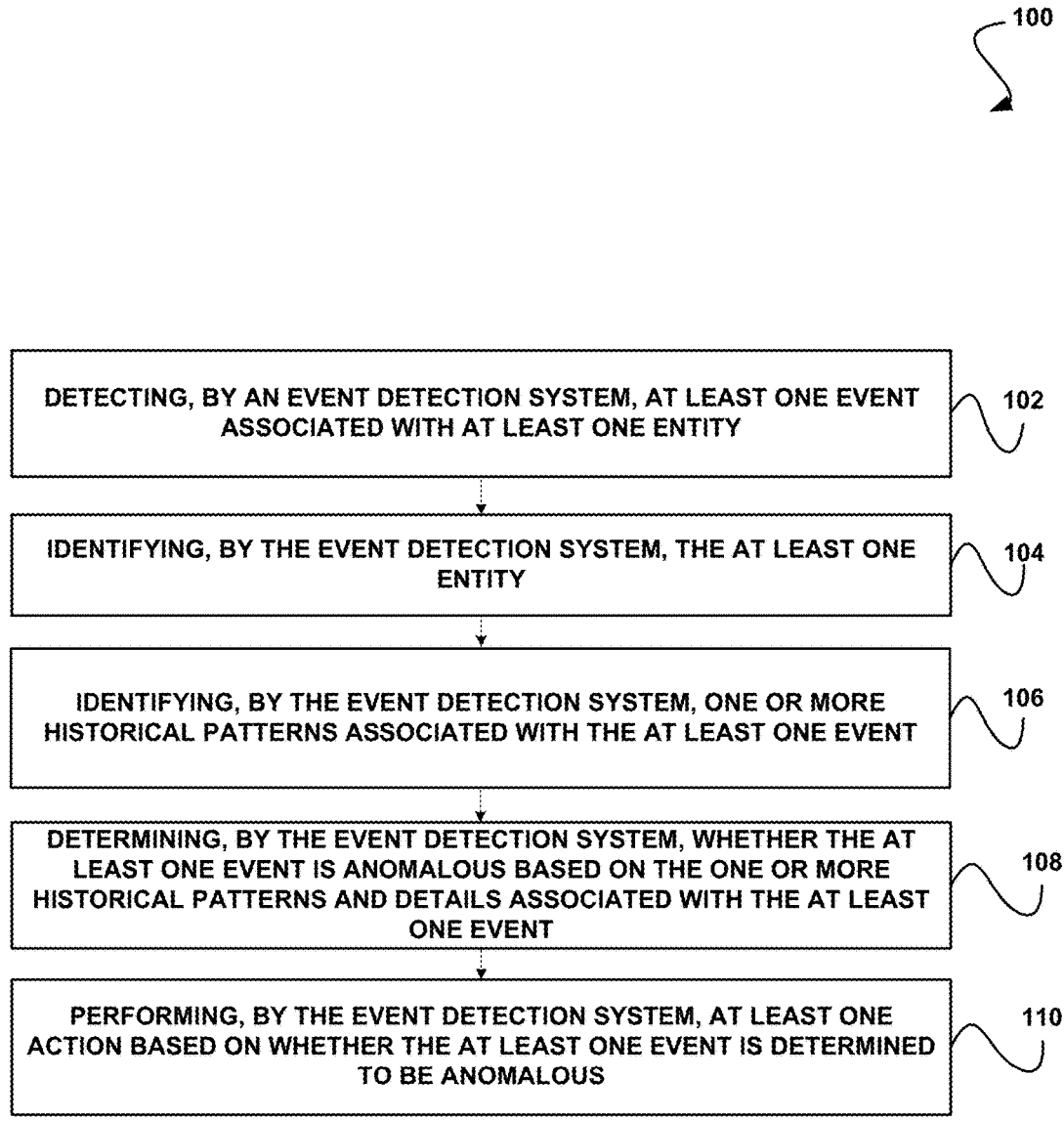
FIG. 1 illustrates a method for detecting regular and irregular events associated with various entities, in accordance with one embodiment.

FIG. 1 illustrates a method 100 for detecting regular and irregular events associated with various entities, in accordance with one embodiment.

In operation, an event detection system detects at least one event associated with at least one entity. See operation 102. The entities may include one or more people, vehicles (e.g. cars, etc.), and/or devices (e.g. phones, computers, appliances, etc.). The event may include any detectable event. For example, the event may include the arrival of an entity (e.g. at a home, business, etc.), the departure of an entity, a system request (e.g. an alarm system request, etc.), setting of an appliance (e.g. a thermostat, oven, etc.), and/or any other detectable event. It should be noted that these events are simplified examples for descriptive purpose. The event may include a combination of complex events that are detectable.

The events may be detected utilizing a variety of sensors and/or systems. Such sensors and/or systems may send information to the event detection system. The sensors and/or systems may include any type of device/sensor/system capable of providing data, such as, for example, cameras, motion sensors, mobile phones, computers, vehicles, appliances, thermal sensors, and/or any other device/sensor/system.

In one embodiment, detecting the event associated with the entity may include receiving at least one request from an external system including the event to be evaluated. In this case, the request may also include a time limit indication representing a maximum time that the external system is willing to wait to receive a response to the request and/or an amount of money that the external system will pay for receiving a response to the request. Further, in one embodiment, the event detection system may request additional information from the external system to evaluate the event.

With further reference to FIG. 1, the event detection system identifies the entity. See operation 104. In various embodiments, identifying the entity may include identifying the entity utilizing at least one of a facial recognition algorithm (e.g. in the case the entities are people, etc.), biometric recognition algorithm (e.g. finger print identification, retina scans, iris scans, etc.), an object recognition algorithm (e.g. in case the entities are vehicles, etc.), and device identification information (e.g. license plate numbers, mobile phone information, model numbers, etc.). The event detection system may identify the entity utilizing a variety of sensors and/or systems (e.g. cameras, etc.), or based on information received from external sensors/devices/systems.

Additionally, the event detection system identifies one or more historical patterns associated with the event. See operation 106. This may include identifying patterns of events that normally precede the event. For example, the event detection system may access one or more databases to identify stored historical patterns. The stored historical patterns include patterns generated/determined by the event detection system based on previous occurrences.

Further, the event detection system determines whether the event is anomalous based on the one or more historical patterns and details associated with the at least one event. See operation 108.

In one embodiment, determining whether the event is anomalous may include utilizing one or more event templates indicating expected behavior associated with the event. Additionally, in one embodiment, determining whether the event is anomalous may include utilizing a scoring model to score the at least one event. In this case, the scoring model may be generated based on a variance between an expected behavior pattern associated with the historical patterns and the actual behavior pattern associated with the event. More information regarding generating and using event templates and scoring models is detailed in the context of the subsequent figures. It should be noted that the details associated with the event may include any identifiable detail, such as time information, entity information, location information, and/or various other information, etc.

The event detection system performs at least one action based on whether the at least one event is determined to be anomalous. See operation 110. The action may include any type of action, such as, for example, logging details of the event, sending a notice that the event is anomalous or not anomalous (e.g. to an external system, a mobile phone, etc.), performing a requested action (e.g. opening a lock, gate, garage door, etc.), initiating a communication (e.g. to emergency personnel, a home owner, etc.), and/or any other action.

It should be noted that the method 100 may be implemented utilizing various systems, hardware, software, applications, user interfaces, etc., as dictated by the implementer. For example, the event detection system may include one or more processors, databases, etc., as well as implement various logic, computer code, applications, and/or user interfaces, etc. Furthermore, the event detection system may be a standalone system or part of another system (e.g. a security system, a smart home system, etc.). Additionally, the event detection system may include various sensors, etc., and/or receive data from external sensors/devices/systems.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
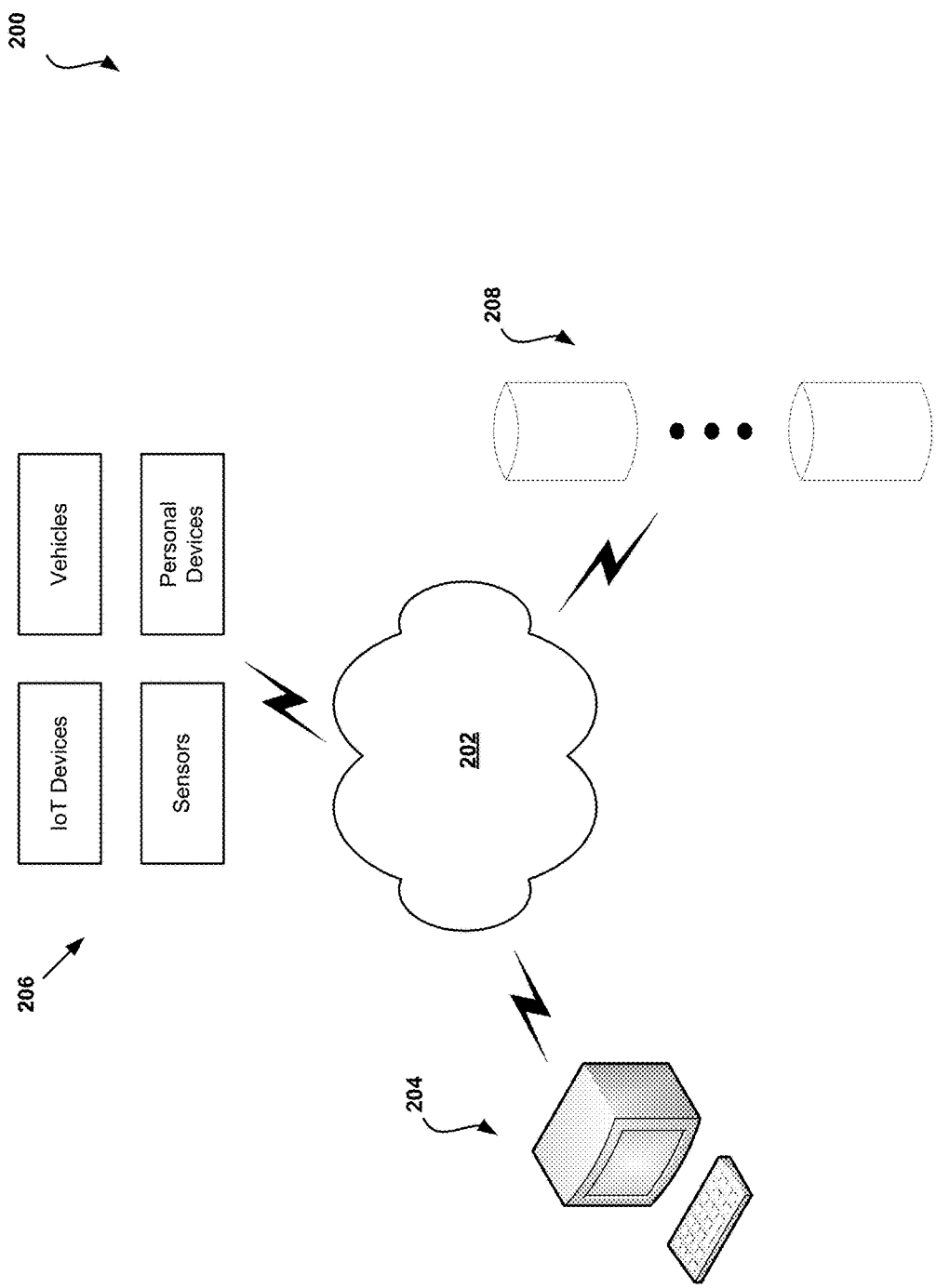
FIG. 2 shows a system for detecting regular and irregular events associated with various entities, in accordance with one embodiment.

FIG. 2 shows a system 200 for detecting regular and irregular events associated with various entities, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an event detection system 204, which may implement a variety of applications, algorithms, and software, etc. The event detection system 204 is capable of communicating with a plurality of systems 206, either directly or over one or more networks 202, which may include devices associated with the Internet of Things (IoT), vehicles (e.g. cars, etc.), sensors (e.g. cameras, motion sensors, audio sensors, etc.), personal devices (e.g. mobile phones, computers, watches, televisions, appliances, etc.), and/or various other systems.

The event detection system 204 is also in communication with one or more repositories/databases 208, which may serve as a storage areas for historical behavior pattern data, which the event detection system 204 has generated.

In operation, the event detection system 204 may implement a method based on machine learning, artificial intelligence, and statistical analysis to identify significant events, and identify behavior patterns that normally precede these significant events. These patterns may be used in some embodiments to detect irregular behaviors and impersonations. The event detection system 204 may be used in some embodiments to detect and protect users from threats, such as fraud, theft, and security breaches.

The event detection system 204 can further use the behavior patterns to identify situations in which additional benefits, such as economic savings or environmental protection, etc., can be achieved. In some embodiments, the event detection system 204 can be used to secure and protect the "Internet of Things", "Internet of Everything" and "Digital life" ecosystems.

Smart home, smart city, smart car, smart appliances offer smooth interaction with human users. Part of the "smart" concept of these and many other smart entities is to anticipate and detect a user's needs and desires and create a supportive ecosystem to facilitate them. In the context of the current description, a user may refer to a human user, or any other entity such as a car, meter, etc.

In this "smart" ecosystem, impersonation becomes a major risk. For example, assume that a smart home disconnects the alarm system, and opens the garage gate and the entrance door when the house owner approaches the house using a car. A friendly smart home environment may try to minimize the active authentication burden of the house owner. For example, a house system may attempt to recognize the owner without requiring the owner to enter long codes, or to acknowledgement of receiving an authorization SMS.

Many techniques can be used to achieve this level of integration. For example, the smart home system might detect the location of the smart phone of the owner, the location of the car, and might even recognize the car's license plate when it is at the entrance of the house, and combine this information to grant access to the house. However, this friendly approach is prone to impersonation risks. For example, a thief that stole the car and the smart phone will be granted access to the house as soon as the thief drives the car to the house. This is just one example and similar examples may occur across all of the smart home, smart city, smart health, and telematics services eco-systems, as well as in more traditional eco-systems such as buying goods using web stores, etc. In some of the cases, the result might end in stolen goods, while in other more severe scenarios, the result might include even more substantial damages (e.g. fires, danger to the health, etc.).

The "smart" ecosystems are protected today mainly by many layers of cyber security, including firewalls, anti-virus software, etc. An important component of the security is the identification of the user. This identification may be done using passwords, scanning fingerprints, eye scanning, and/or voice recognition, etc. With the proliferation of smart entities, the active identification becomes a burden, and more and more "smart" providers are looking for ways to minimize and simplify the active identification, for example, by automatic password completion in smartphones and PCs, or by using Single Sign On (SSO) mechanisms.

Behavior/behavioral analysis in the context of security analyzes one or a plurality of behaviors related to an entity, either a human, or a device, and uses this information to decide if an action is performed by the entity or if there is something unexpected in the behavior that could point to a risk of impersonation.

The event detection system 204 detects relevant complex behaviors patterns of one or more related entities using one or more appliances, etc. The event detection system 204 may further use these behaviors to detect impersonation, and to protect from cyber fraud. The event detection system 204 may further use these behaviors to identify situations in which additional benefits, such as economic savings or environment protection, can be achieved.

In some embodiments, the event detection system 204 may replace existing authentication mechanisms. In other embodiments, the event detection system 204 may provide additional inputs to existing authentication mechanisms. In some embodiments, the event detection system 204 may be used to detect irregularities or abnormal behaviors, not necessarily impersonation, and provide this input to other systems that might use it for a multitude of purposes. For example, the event detection system 204 may pass information about a detected irregular behavior of a patient to a health care system, and based on that the health care system, might generate a call for medical assistance. As another example, the event detection system 204 may detect an irregular behavior of a track that might indicate that a device or vehicle has been stolen or used for a malicious propose.

An example of a behavior pattern is a user that arrives at home on weekdays between 4:00 and 6:00 PM, his house is usually empty before his arrival, typically he drives around one hour from his work area to his house, and his typical route is via Highway 35 east. Once this pattern is identified by the event detection system 204, it can be used for several purposes.

First, the pattern may be used as part of the authentication process, such as the event detection system 204 (e.g. as part of a smart house, etc.) identifying that the car and phone of the user are approaching the house, and that their behavior matches the expected pattern. Then, the event detection system 204 (e.g. as part of a smart house, etc.) may open a gate and disarm the alarm.

However, if the car and smartphone are approaching the home in a way that does not match the expected pattern, then the event detection system 204 (e.g. as part of a smart house, etc.) might request an active identification, such as entering a code, before the gate is opened and alarm disarmed. The event detection system 204 can combine the behavior patterns of the different users that live in the same house, and can deduce that the house is usually empty in the afternoon on weekdays, combining this with the house members' temperatures preferences, traffic information and weather information, and the house's air-conditioning system historical performance, and the event detection system 204 can deduce that the ideal time to turn on the air-conditioning on a certain day is 27 minutes after the user left his work. This kind of deduction can be used by the event detection system 204 to optimize the air conditioning usage, reduce costs, avoid energy losses, and help the environment.

It should be noted that this example may be an oversimplification because a user may have multiple behavior patterns. For example, sometimes the user may drive home using Highway 35, other times using Highway 40, etc. Moreover, in some cases the event detection system 204 will analyze the patterns of groups of users and not of a single user. The behaviors might be affected and dependent on many factors, such as the weather, or more complex factors.

For example, the behavior of one user might depend on the behavior of another user. As an example, the first user may be a smart refrigerator that sends a notice to a human user that the milk due date is over. The human user then, instead of driving directly from work to home, will drive to a supermarket, buy milk, and only then will continue home. Thus, the human user's driving route will be impacted by another entity.

In one embodiment, the event detection system 204 may identify a set of important events (e.g. a car arriving home, etc.) and a set of events and or statuses based on various device/sensor input, etc., (e.g. it is 4 PM, it is raining, the car went from the user work to the house via Highway 7 east, and its average speed was 50 miles per hour, etc.), and generate a score that the target event is an expected behavior pattern (e.g. a score between 0 to 1, etc., showing the confidence that the behavior matches an expected behavior).

The event detection system 204 may also recognize that expected behaviors can change both with days of the week and with the season. For example, on Thursdays the user may leave early to go to the movies and in the summer he often goes to the sea before returning home, which may change over time. For example, a user might change his work place, his kids might change to a new school, the user's new boss may request that he regularly work over time, or a certain road will be closed for a period of 3 months causing huge traffic jams.

Any event may be given either a time stamp, indicating when the event occurred, or if it is a continuous event, start and end time stamps. The end timestamp might be empty denoting that the event has not ended.

Some examples of events are: 1) a car with license number 99999 arrives to 1st avenue number 76 at 5 PM 2017-01-01; 2) the air condition on 1st avenue number 76 was on from 5 PM 2017-01-01 to 11 PM 2017-01-01; 3) the air condition on 1st avenue number 76 was turned on at 5 PM 2017-01-01; 4) the air condition on 1st avenue number 76 was turned off at 11 PM 2017-01-01.

Events may be instances of event templates. Some examples of templates may include: 1) car with license _____ arrives to address _____ at time _____; 2) car with license number 9999999 arrives to address _____ at time _____; 3) car with license number 99999 arrives to the 1st avenue number 76 at time _____.

It should be noted that a single event might be an instance of more than one event template. For example, the event "car with license number 99999 arrives to the 1st avenue number 76 at 5 PM 2017-01-01" may be an instance of the three event templates described above.

The event detection system 204 may categorize important event templates, which may be event templates that are denoted as important. For example, a template including "car with license number 9999999 arrives to address _____ at time _____" may be denoted as an important event template.

An important event may be an event that is an instance of at least one important event template. A behavior may be identified by the event detection system 204 as a set of events that occurred before or during an important event. A behavior does not necessarily have to include all the events that occurred before or during an important event, it may include a subset of them.

A behavior pattern may be identified by the event detection system 204 as a set of event templates with specific or relative temporal relations that includes at least one important event template that occurs (or ends if it is a prolonged event) after the occurrence or start of any other pattern in the sequence.

An example of a behavior pattern is: Car with license number 99999 arrives to the 1st avenue house number 76 at time _____; 60 minutes before arriving at the 1st avenue house number 76 the car was on highway 35; the average velocity of the car 30-60 minutes before arriving to the house was 50 miles per hour.

An expected behavior pattern may be identified by the event detection system 204 as a behavior pattern that is expected in normal situations. Multiple incompatible expected behavior patterns may exist (e.g. 80% of the time, 60 minutes before arriving to the house car with license number 99999 is on Highway 30, and 20% it is on Highway 40, etc.).

A feature of a behavior pattern may be an event template with a temporal relation to at least one of the other event templates in the behavior pattern. Using the example above, this may include the location of the car 60 minutes before arriving, and its average speed 30-60 minutes before arriving are features of the behavior pattern. The features of a behavior pattern must occur or start before the end of the important event in the behavior pattern. For simplicity, the term "feature" will be used herein to denote a feature of a behavior pattern.

The event detection system 204 implements a method to learn and update and inventory of expected behaviors' patterns.

Effective machine learning methods often depend, both for supervised learning and for unsupervised learning, on having examples of both positive (regular behaviors) and negative behaviors (e.g. the behavior of an impostor). The difference is that in supervised learning the negative examples are tagged, and in unsupervised learning the negative examples are not tagged.

The event detection system 204 does not need to rely on having both positive and negative examples, it can learn using only positive examples. This kind of learning is called one-class classification. The event detection system 204 may use negative examples if they are available, but in many realistic cases they will not be available.

The event detection system 204 may automatically learn new expected behavior patterns, and automatically delete or disregard obsolete expected behavior patterns. In learning new behaviors patterns and forgetting obsolete behavior patterns, the event detection system 204 considers both seasonal changes (e.g. behaviors depending on the day of week or the season, etc.) and "over time" changes (e.g. changes in behavior as the user becomes older, etc.).

In some embodiments, expected behaviors patterns may be assigned scores or weights by the event detection system 204. For example, the event detection system 204 may generate a score reflecting a relative expectation to see each behavior pattern.

The event detection system 204 may further use the learned expected behaviors patterns to score new observed behaviors. In some embodiments, the score may be a number between 0 to 1, 0 meaning that the new observed behavior is extremely distinct from the learned expected behaviors, and 1 meaning that it is very similar to the learned expected behaviors. In different embodiments, different criteria may be used to estimate the distance from the learned expected behaviors. In some embodiments, this score may be passed to an external system from the event detection system 204. Further, the behavior score may be passed to an external system, along with an "explanation" of the cause of the score.

In some embodiments, the event detection system 204 may use the new observed behavior to update the group of learned expected behaviors patterns either by adding new expected behavior patterns, by deleting expected behavior patterns, or by updating the score of one or more expected behavior patterns.

In some embodiments, the event detection system 204 may use the learned expected behaviors to infer additional insights. For example, by analyzing all of the expected patterns of a household member, the event detection system 204 can learn when there is an ideal time to turn on/off an air-conditioning system. In some embodiments, additional information may be used by the event detection system 204 to improve insights (e.g. weather information, etc.). In some embodiments, the inferred insights may be given to external systems by the event detection system 204.

Figure 3:
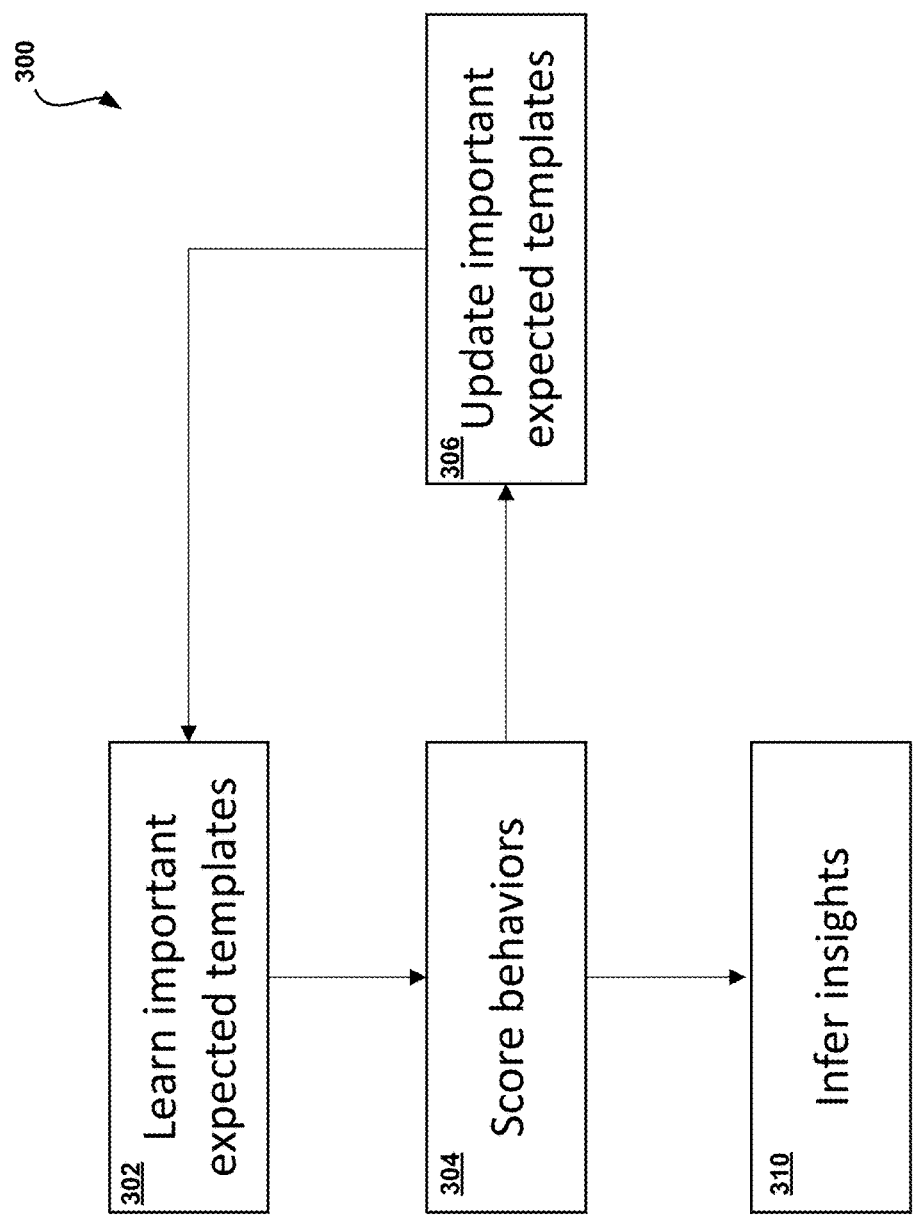
FIG. 3 shows a system flow chart for an event detection system, in accordance with one embodiment.

FIG. 3 shows a system flow chart 300 for an event detection system, in accordance with one embodiment. As an option, the flow chart 300 may be implemented in the context of the details of the previous figures and/or any subsequent figure(s). Of course, however, the flow chart 300 may be implemented in the context of any desired environment. Further, the aforementioned definitions may equally apply to the description below.

As shown, the event detection system learns the important expected templates and creates a scoring model. See operation 302. Important events (such as arriving home, etc.) are defined by the event detection system. In various embodiments, the important events may be defined internally by the event detection system (e.g. either automatically, or with user inputs utilizing a GUI or input files, etc.), or by receiving external requests (e.g. via an API, etc.).

For each of the important event templates (e.g. a user's car and phone arrive home, etc.) the event detection system: 1) selects key features per important expected behavior; 2) identifies expected behavior patterns; 3) measures the significance of variance from each expected behavior pattern; and 4) creates a scoring model.

As an example, selecting key features per important expected behavior may include the event detection system identifying hour of arrival, day of week, location 5, 30 and 60 minutes before arriving home, and average speed 15 minutes before arriving home.

As another example, identifying expected behaviors patterns may include the event detection system using the selected key features to create expected behavior patterns. Expected behavior patterns may include, for example: On Thursdays when the car arrives home around 6 PM its average speed 15 minutes before arriving home is between 12 to 22 miles per hour; On Thursdays when the car arrives home around 6 PM the car's location 30 minutes before arriving home is either on Highway 3 or Interstate road 54; 60 minutes before arriving home around 6 PM the car's location is near the user's work place.

Note that the expected behavior patterns do not have to be mutual exclusive. In other words, multiple expected behavior patterns might have one or more common behaviors.

In some embodiments, the event detection system may first identify the important expected patterns, (or a user may define them utilizing a user interface), and based on this, the event detection system may define the key features related to the expected behavior pattern.

For measuring the significance of variance from each expected behavior pattern, the event detection system may, for each of the expected behavior patterns, analyze the significance of variance from the pattern. For example, for the pattern in the previous example "Thursdays when the car arrives home around 6 PM its average speed 15 minutes before arriving home is between 12 to 22 miles per hour", the event detection system may determine whether the significance of arriving at 6:30 PM is very different from the identified pattern, and also determine the significance of having an average speed 15 minutes before arriving of 20 miles per hour versus 45 miles per hour. Different techniques, including but not limited to machine learning techniques and statistical analysis techniques, can be used by the event detection system for analyzing the significant of variance from the patterns.

For creating a scoring model, the event detection system may, for each important event template, generate a scoring model. The scoring model may utilize a behavior that includes an important event that belongs to the important template and the event detection system may return a score denoting in what degree the behavior represents or deviates from the expected behaviors' patterns. The behavior may not fit into a single expected behavior pattern, but may have proximity to several expected behavior patterns. Different techniques, including machine learning techniques and statistical analysis techniques, can be used for building the model.

With further reference to FIG. 3, the event detection system scores one or more observed behaviors. See operation 304. The event detection system receives a request to score one or more new observed behaviors and calculates their score according to the models created in operation 302.

The event detection system learns from new observed behaviors, including but not limited to those received for scoring in operation 304, and updates the learned expected behavior patterns either by adding new expected behavior patterns, by deleting expected behavior patterns, or by updating the score of one or more expected behavior patterns. See operation 306.

The event detection system uses the learned expected behaviors patterns to infer additional insights. See operation 310.

In general, the event detection system described herein authenticates and/or detect irregularities when "important" events occur. Instead of building a general fingerprint/behavior pattern of a user, the event detection system builds temporal behavior patterns that precede the important event occurrence.

For example, assume that John's car arrives at John's home at 8 PM and the event detection system wants to authenticate that John is in his car. The event detection system uses statistics to build a temporal behavior pattern from the event. The event detection system will build a behavior pattern of the behavior of John before he arrives home, and use this pattern to authenticate John. The event detection system may build a behavior pattern that "John usually calls his wife 30 minutes before arriving home", etc.

A user at any given time has multiple behavior patterns, not all of them with the same frequency. For example, most of the days John drives to work at 7 AM, but he also, even though rarely, drives to work at LOAM. The event detection system considers these alternative behavior patterns when determining whether an event is anomalous.

An observed behavior often will not match any specific behavior pattern but will have different degrees of proximity to the multiple patterns of the entity being authenticated. The event detection system addresses this complexity.

The event detection system also builds behavior patterns that include multiple loosely coupled entities. For example, a behavior pattern might include a behavior of different entities (e.g. if the mother stays at work the father will arrive earlier, or vice versa, to receive the child when he returns from school, etc.).

Further, the event detection system may use the learned behavior patterns to identify situations in which additional benefits can be achieved, such as economic savings or environmental protection, etc.

Figure 4:
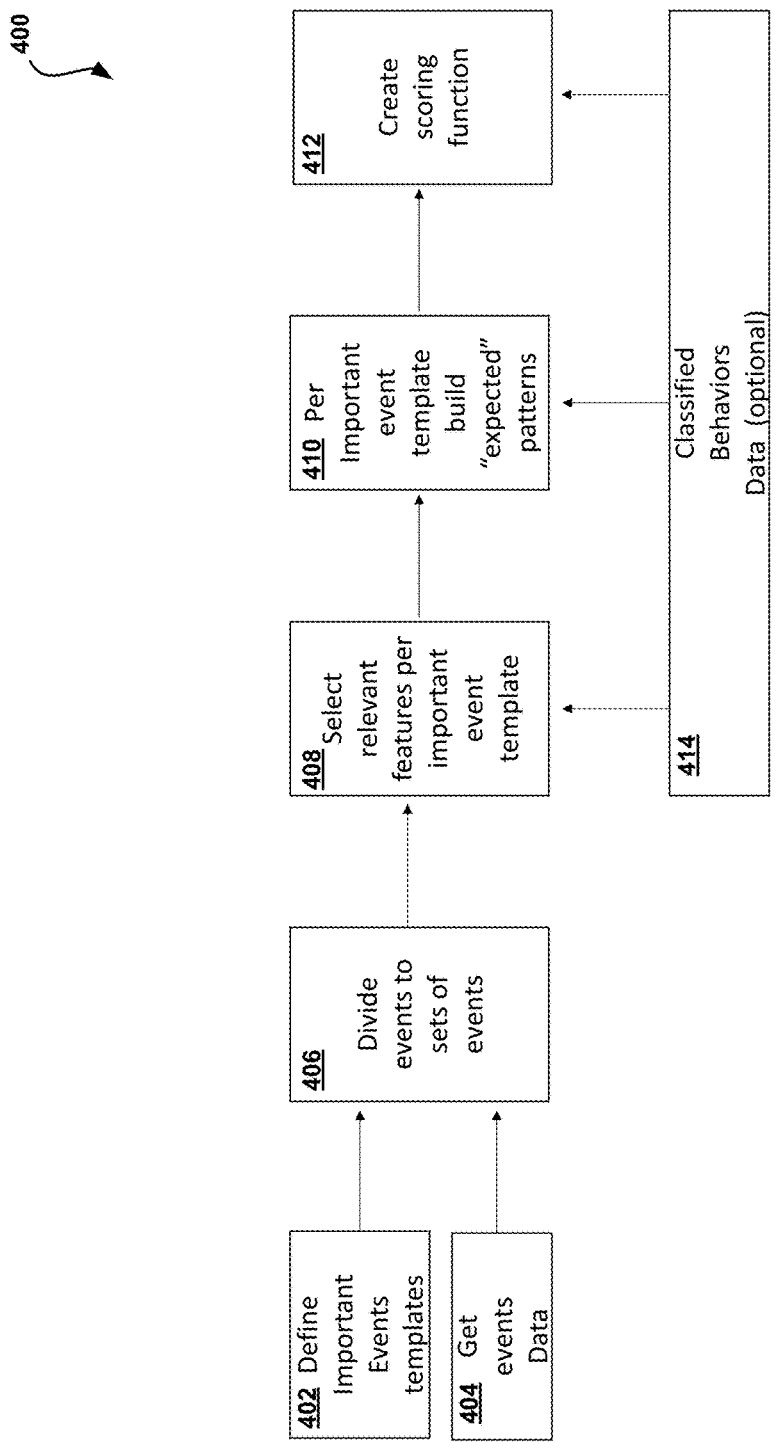
FIG. 4 shows a system flow chart for learning new expected behavior patterns and updating the patters based on new information, in accordance with one embodiment.

FIG. 4 shows a system flow chart 400 for learning new expected behavior patterns and updating them based on new information, in accordance with one embodiment. As an option, the flow chart 400 may be implemented in the context of the details of the previous figures and/or any subsequent figure(s). Of course, however, the flow chart 400 may be implemented in the context of any desired environment. Further, the aforementioned definitions may equally apply to the description below.

In step 402, important events templates are defined by an event detection system. An important event template is any kind of event template marked as important. In some embodiments, this may include templates used to authenticate the identity of a user or the appropriateness of the event. Examples of important events templates may include, for example, arriving home, buying a pay per view movie, closing a gate in a factory, turning off an alarm system, etc. An important event template might be a single event (e.g. arriving home, etc.) or a sequence of events (e.g. arriving home and disarming the alarm, etc.). An important event template might include several alternative sequences (e.g. arrive home and then if the alarms is armed, disarm it, and then either open the refrigerator or turn on the air conditioning, etc.).

In some embodiments, important events templates may include templates of events with security, economic, health and/or environmental implications. Further, in some embodiments, the event detection system may implement different techniques for defining important events templates. For example, event templates can be defined using a GUI associated with the event detection system, using an API associated with the event detection system, and using files (e.g. XML files, etc.) input to the event detection system. In some embodiments, the event detection system may use machine learning and/or artificial intelligence and/or statistical analysis algorithms to identify important event templates. Of course, in one embodiment, the event detection system may automatically generate the event templates and allow user input for additions/modifications.

An important event template can be related to a certain user (e.g. a specific user arrives to his house, etc.), to a group of users (e.g. one of the family members arrives to their house, etc.), or independent of any user (e.g. a gate is open, etc.). For each important event template, the key values may be defined by the event detection system. For example, for the event type car arriving home, the event detection system can define that the license number of the car and the address of the house are the key values.

With further reference to FIG. 4, in step 404 the event detection system receives multiple events. An event can be anything measurable, such as the temperature, the speed and location of a car, a car arriving home, etc. Any event may have either a time stamp when the event occurred, or if it is a continuous event, start and end time stamps. The end timestamp might be empty, denoting that the event has not ended.

An event template can be instantiated to a specific event by adding a time stamp, or star-end time stamp, and initiating the general attributes to specific values (e.g. the event type car arriving home can be instantiated to car license number 999999 arrived to house no. 19 in the 1st street 6:12 PM on 2017-01-01, etc.).

The events received in step 404 may include one or more events that are instantiations of an important event type defined in step 402.

In step 406, the events received in step 404 may be divided into two groups. In this case, group A events may be instantiations of important event types defined in step 402 and group B may include all the other events. The events in group A may be divided to subsets of events, where all the events in a subset are instantiations of the same event type with the same values in the key fields.

For example, given an important event template "car arrives at home", where the key fields are the car license and the house address, then the following three events may be divided into two sets, the first including event a and c, and the second including event b: a) Car license number 999999 arrived to house no. 19 in the 1st street at 6:12 PM on 2017-01-01; b) Car license number 888888 arrived to house no. 18 in the 8th street at 6:12 PM on 2017-01-01; c) Car license number 999999 arrived to house no. 19 in the 1st street 8 PM on 2017-01-02. Note each event in group A will belong to one or more subset of events.

In step 410, the event detection system selects, per subset of events constructed in step 406, the key features that are most relevant to analyze the authenticity of an event in the set. Features can be either synthesized by the event detection system, and/or be defined using different techniques, for example but not limited by using a GUI, using an API, using files (e.g. XML files, etc.). The features may be based on the event types received in step 404.

The event detection system takes all the features and the important events in the set created in step 406 and selects a subset of features that are important to estimate the authenticity of the behaviors in the set.

Note that the sub-set of features can be the whole set of features. However, due the sensibility of most machine learning techniques and statistical analysis, selecting an appropriate subset (e.g. trying to minimize redundancy between the features) is helpful.

In case that in step 414 the event detection system provides examples of inappropriate behaviors, these behaviors can also be used in this step to improve the features selection. In step 410, per important event template subset selected in step 406, and per the features selected per important event template, using the events received in step 404, a set of expected patterns is built. For example, for car license number 999999 arrived to house no. 19, the patterns might be: Arrival at 6 PM, location 15 minutes prior to arriving should be Interstate 1, and the speed one hour prior to arrival should be 20 miles per hour; Arrival at 8 PM, location 15 minutes prior to arriving should be Interstate 2, and the speed one hour prior to arrival should be 40 miles per hour.

Note that in reality it is unlikely that the behavior will completely match any specific pattern built in step 410. For example, car license number 999999 may have arrived to house no. 19 at 15:45 PM, 15 minutes before arriving the car was near the entrance to Interstate 1 and the car speed 1 hour prior to arrival was 45 miles per hour.

To understand the degree of acceptability of this behavior, in step 412, the event detection system analyzes per pattern template, and per attribute, its sensibility based on the relevant events received in step 404. For example, if the events received in step 404 show a large fluctuation in the speed of the car 1 hour previous to the arrival home, then the event detection system scoring should be less sensible to the speed. The sensibilities can be learned combining various techniques of machine learning, statistical analysis, and/or inputs by an external system or a human user using a GUI or files. Note that the sensibility is not necessarily per feature, it might be assigned to a complex combinations of features. For example, the sensibility to speed may decrease if the arrival hour is after 8:00 PM and the car did not use Interstate 1.

The result of the event detection system performing step 412 is a model that receives an important event and all the events that belong to its relevant features (selected in step 410). The event detection system uses the sensibility analysis to give a score representing the acceptability of the important event. For example, the event detection system may return values between 0 and 1, where if it is 0 the important event is unacceptable and if it is 1 the event is acceptable.

The function generated in step 410 and utilized by the event detection system is capable of handling situations in which it does not receive all/part of the information about the events that belong to the relevant features. For example, the scoring function of the event detection system may receive the speed 60 minutes prior the car arrival to the house, but information about its location 15 minutes prior to arrival may be missing.

As in steps 408 and 410, the availability of negative examples provided by step 414 can be used by the event detection system in step 412 to improve its learning process and the resulting scoring function.

Step 414 provides the event detection system examples of unacceptable combinations of important events and behaviors for use in steps 408, 410, and 412. For example, if a thief stole the car and used it to enter the house to rob it, the event detection system may determine the behavior of the car in this case. Having this kind of information, which is rare, can improve the feature selection in step 408, the normal pattern building in step 410, and the function learning in step 412. Additionally or alternatively, another system or user can create such synthetic scenarios of unacceptable sequences to improve the learning of the event detection system.

Figure 5:
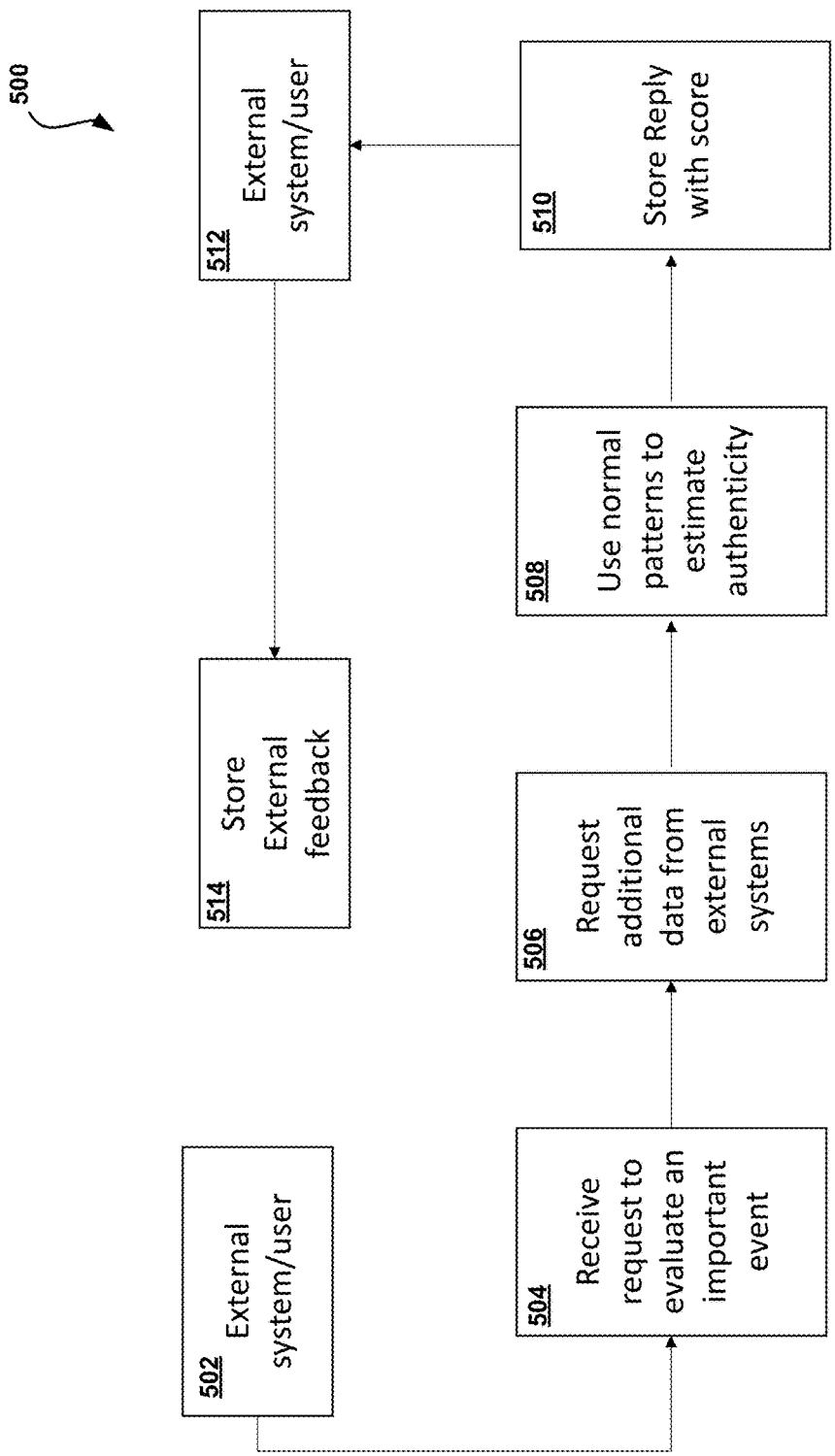
FIG. 5 shows a system flow chart for authenticating an important event, in accordance with one embodiment.

FIG. 5 shows a system flow chart 500 for authenticating an important event, in accordance with one embodiment. As an option, the flow chart 500 may be implemented in the context of the details of the previous figures and/or any subsequent figure(s). Of course, however, the flow chart 500 may be implemented in the context of any desired environment. Further, the aforementioned definitions may equally apply to the description below.

In step 502, an external system (e.g. a security system, smart home system, etc.) generates a request to evaluate whether an important event is acceptable/expected. The request includes the event to be evaluated, and might include additional events. In some embodiments, the request may include a time limit indication representing the maximum time that the external system/user is willing to wait to receive the answer. In some embodiments, the request may include the amount of money that the external system/user will pay for receiving the response.

In step 504 the request is received by the event detection system and the appropriated evaluation model from those created in step 412 of FIG. 4 is selected. In some embodiments, the event detection system will estimate the time needed to respond the request, consider the time limit given in step 502 for providing an answer, and the amount of money that will be received for providing the answer, and the other evaluation requests, and based on that the event detection system will prioritize between multiple requests, or even reject some requests.

In step 506, the event detection system analyzes the model selected in step 504 and the events received in step 502. If the events received are not sufficient to evaluate the model for the important event (i.e. the event detection system does not have all the needed features required for evaluating the model), then in step 506 the event detection system attempts to get the missing information by looking at internal data sources and/or requesting additional information from external systems. Once the needed information is acquired, or it is determined that part of the information is not accessible (for example the time limit in the request from step 502 does not permit the event detection system to wait until the information is available), the process continues to step 508.

For example, the model used by the event detection system may require the location of the car 60, 30 and 15 minutes prior to the arrival to the house, and weather information. If the information passed by the external system in step 502 includes only the location of the car 15 minute prior to arrival, then the event detection system may send a request to an external system to get the location of the car 60 and 30 minutes prior to arrival, and may utilize Internet resources to obtain the relevant weather information.

In step 508, the event detection system evaluates the request using the scoring function created in step 412 of FIG. 4 and the available information.

In step 510, the event detection system sends the evaluation result to the external system/user that originated the evaluation request. In some embodiments, only the evaluation score will be sent (e.g. 0.7, etc.). Additionally, in some cases part or all the supporting evidence may be sent (i.e. the events that were used to perform the calculation such as the location of the car 15, 30 and 60 minute prior to arrival, etc.). In some embodiments, the event detection system may also send an explanation of the reason for the scoring (e.g. the location 60 minute prior to arrival was suspicious, etc.). Further, in some embodiments, a data repository may be used by the event detection system to store the request, all the information used to evaluate the request and/or the evaluation. In other embodiments, for example, due to privacy and security reasons, the request, the data used to evaluate the request and the result, or part of them, will not be stored in a data repository. The stored information may be used by the event detection system in step 414 of FIG. 4.

In step 512, the response is received by the external system/user. In some embodiments, the external user may send feedback to the event detection system. This feedback may be stored by the event detection system in step 514. This feedback may be used in step 412 of FIG. 4.

Figure 6:
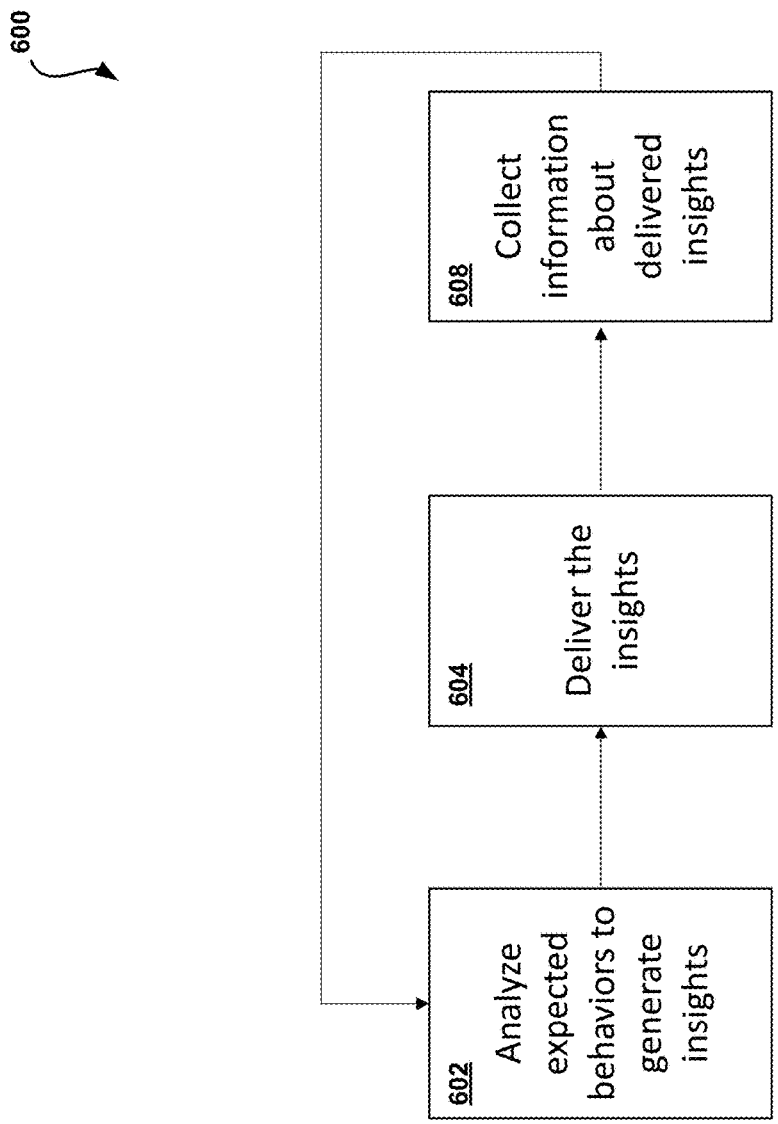
FIG. 6 shows a system flow chart for generating additional insights, in accordance with one embodiment.

FIG. 6 shows a system flow chart 600 for generating additional insights, in accordance with one embodiment. As an option, the flow chart 600 may be implemented in the context of the details of the previous figures and/or any subsequent figure(s). Of course, however, the flow chart 600 may be implemented in the context of any desired environment. Further, the aforementioned definitions may equally apply to the description below.

In step 602, the event detection system uses the expected behavior patterns to generate insights. The insights may be generated by using one or more technologies including, machine learning, statistical analysis, artificial intelligence, rule based systems, and expert systems. In step 604, the event detection system delivers the insights to users and/or external systems. In some embodiments, the insights may be stored by the event detection system (e.g. in a database, etc.).

In step 608, the target insight templates are provided by the event detection system. For example, a target insight may be to detect wasted energy due to air-conditioners turned on unnecessarily. In other embodiments, the event detection system may search for interesting insights autonomously, for example, by using artificial intelligence inference methods.

In some embodiments in which the event detection system searches for interesting insights autonomously, the event detection system may receive feedback from users, or from external systems, regarding the importance or relevance of the detected insights, and may use these feedback to improve its autonomous search for insights in step 602. In some embodiments, the event detection system may combine autonomous searching for insights with searching for insights based on target templates.

Figure 7:
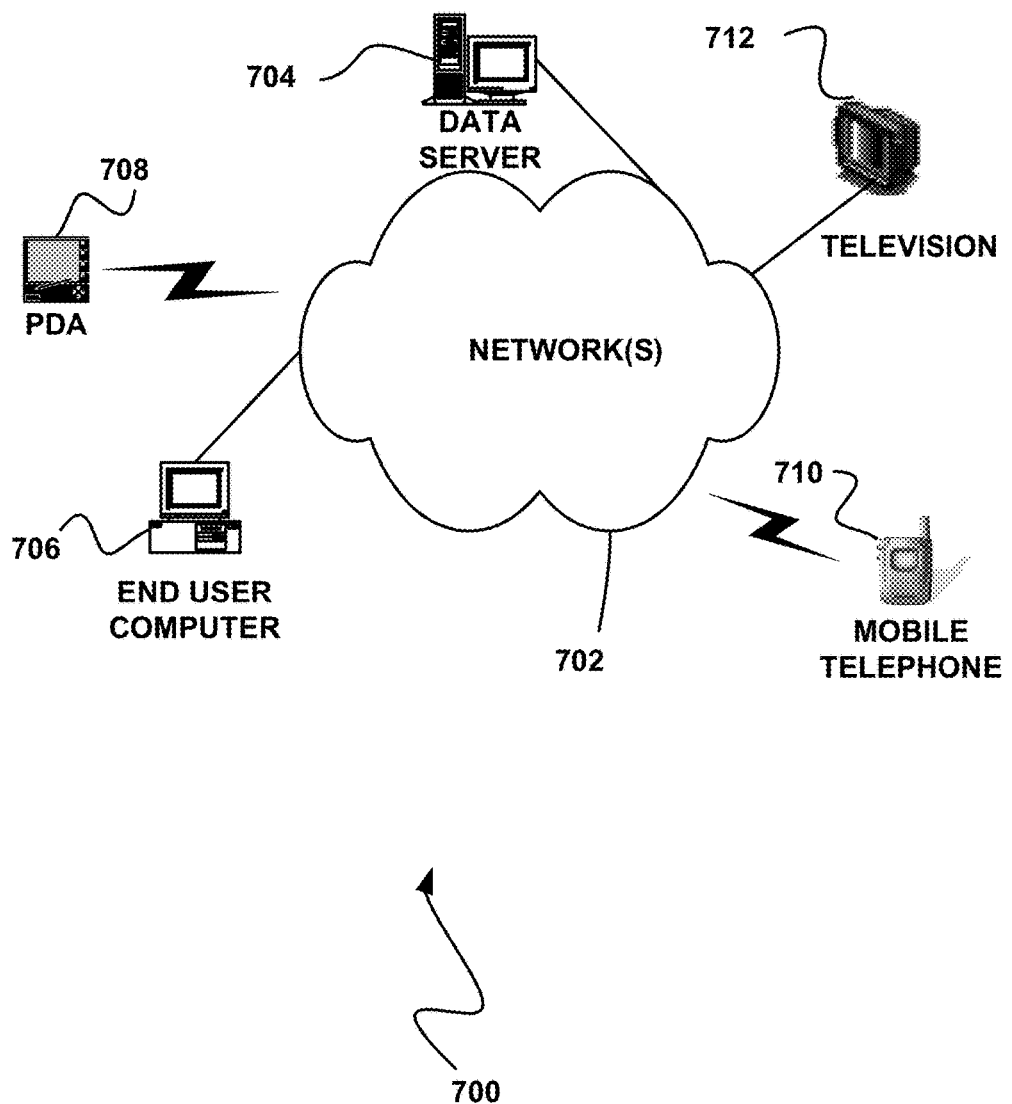
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
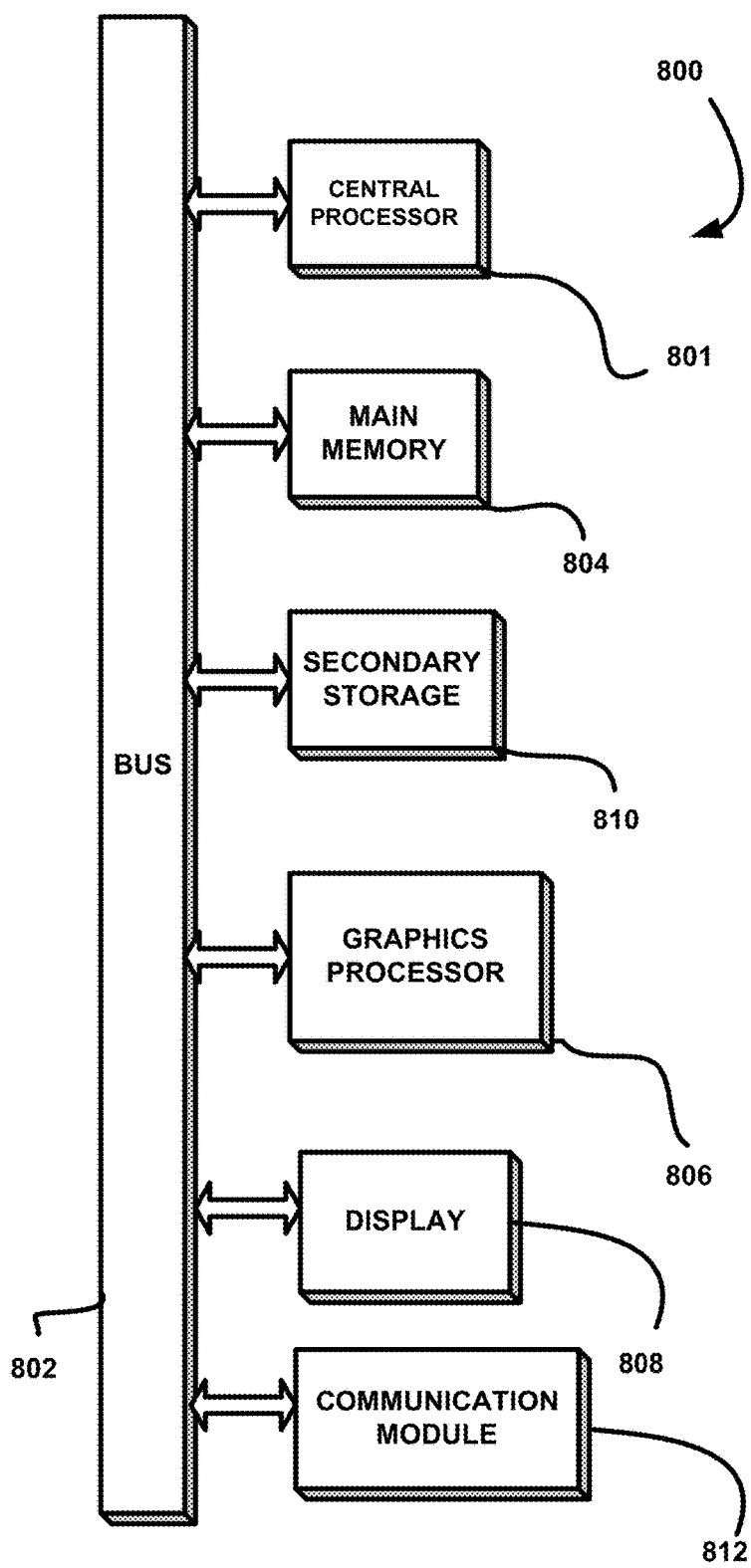
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   learning, by an event detection system, patterns of events across a plurality of entities, utilizing historical events identified for the plurality of entities;
   storing, by the event detection system, the patterns of events including storing for each pattern of events:
   key features of the pattern of events, and
   an indicator of one or more entities associated with the pattern of events;
   building, by the event detection system, a scoring model for the patterns of events, the scoring model indicating scores for variances to the patterns of events;
   detecting, by the event detection system, a sequence of events including an event to authenticate;
   identifying, by the event detection system, one or more of the stored patterns associated with the event to authenticate;
   using the scoring model to score, by the event detection system, the event to authenticate based on the detected sequence of events and the one or more of the stored patterns associated with the event to authenticate;

determining, by the event detection system, whether the event to authenticate is anomalous based on the score of the event; and performing, by the event detection system, at least one first action responsive to determining that the event is anomalous; and performing, by the event detection system, at least one second action responsive to determining that the event is not anomalous.

2. The method of claim 1, wherein the plurality of entities include a person, a vehicle, and a device.

3. The method of claim 1, wherein the plurality of entities are identified utilizing at least one of a biometric recognition algorithm, a facial recognition algorithm, an object recognition algorithm, and device identification information.

4. The method of claim 1, wherein detecting the sequence of events includes receiving at least one request from an external system including the sequence of events with the event to authenticate.

5. The method of claim 4, wherein the at least one request from the external system further includes a time limit indication representing a maximum time that the external system is willing to wait to receive a response to the at least one request.

6. The method of claim 4, wherein the at least one request from the external system further includes an amount of money that the external system will pay for receiving a response to the at least one request.

7. The method of claim 4, wherein the event detection system requests additional information from the external system to score event.

8. The method of claim 1, wherein the event detection system utilizes information associated with the one or more patterns to generate insights.

9. The method of claim 1, wherein the event is authenticated when it is determined that the event is not anomalous.

10. The method of claim 1, wherein the event to authenticate is an event included in at least one event template that has been labeled an important event template.

11. The method of claim 1, wherein the event to authenticate is scored based on key features identified from the sequence of events and the key features stored for the one or more of the stored patterns associated with the event to authenticate.

12. The method of claim 1, wherein the at least one first action includes requesting active identification required to perform a requested action, and wherein the at least one second action includes performing the requested action without requiring the active identification.

13. A computer program product embodied on a non-transitory computer readable medium, comprising computer code for:

learning, by an event detection system, patterns of events across a plurality of entities, utilizing historical events identified for the plurality of entities;

storing, by the event detection system, the patterns of events including storing for each pattern of events:
key features of the pattern of events, and
an indicator of one or more entities associated with the pattern of events;

building, by the event detection system, a scoring model for the patterns of events, the scoring model indicating scores for variances to the patterns of events;

detecting, by the event detection system, a sequence of events including an event to authenticate;

identifying, by the event detection system, one or more of the stored patterns associated with the event to authenticate;

using the scoring model to score, by the event detection system, the event to authenticate based on the detected sequence of events and the one or more of the stored patterns associated with the event to authenticate;

determining, by the event detection system, whether the event to authenticate is anomalous based on the score of the event; and performing, by the event detection system, at least one first action responsive to determining that the event is anomalous; and performing, by the event detection system, at least one second action responsive to determining that the event is not anomalous.

14. The computer program product of claim 13, wherein the plurality of entities include a person, a vehicle, and a device.

15. The computer program product of claim 13, wherein the plurality of entities are identified utilizing at least one of a biometric recognition algorithm, a facial recognition algorithm, an object recognition algorithm, and device identification information.

16. An event detection system comprising one or more processors operable for:

learning, by an event detection system, patterns of events across a plurality of entities, utilizing historical events identified for the plurality of entities;

storing, by the event detection system, the patterns of events including storing for each pattern of events:
key features of the pattern of events, and
an indicator of one or more entities associated with the pattern of events;

building, by the event detection system, a scoring model for the patterns of events, the scoring model indicating scores for variances to the patterns of events;

detecting, by the event detection system, a sequence of events including an event to authenticate;

identifying, by the event detection system, one or more of the stored patterns associated with the event to authenticate;

using the scoring model to score, by the event detection system, the event to authenticate based on the detected sequence of events and the one or more of the stored patterns associated with the event to authenticate;

determining, by the event detection system, whether the event to authenticate is anomalous based on the score of the event; and performing, by the event detection system, at least one first action responsive to determining that the event is anomalous; and performing, by the event detection system, at least one second action responsive to determining that the event is not anomalous.

* * * * *